Aug. 28, 1923.
C. W. MARTIN ET AL
1,466,539
ITINERANT VENDING AND SALES VEHICLE
Filed Jan. 14, 1921  4 Sheets-Sheet 2
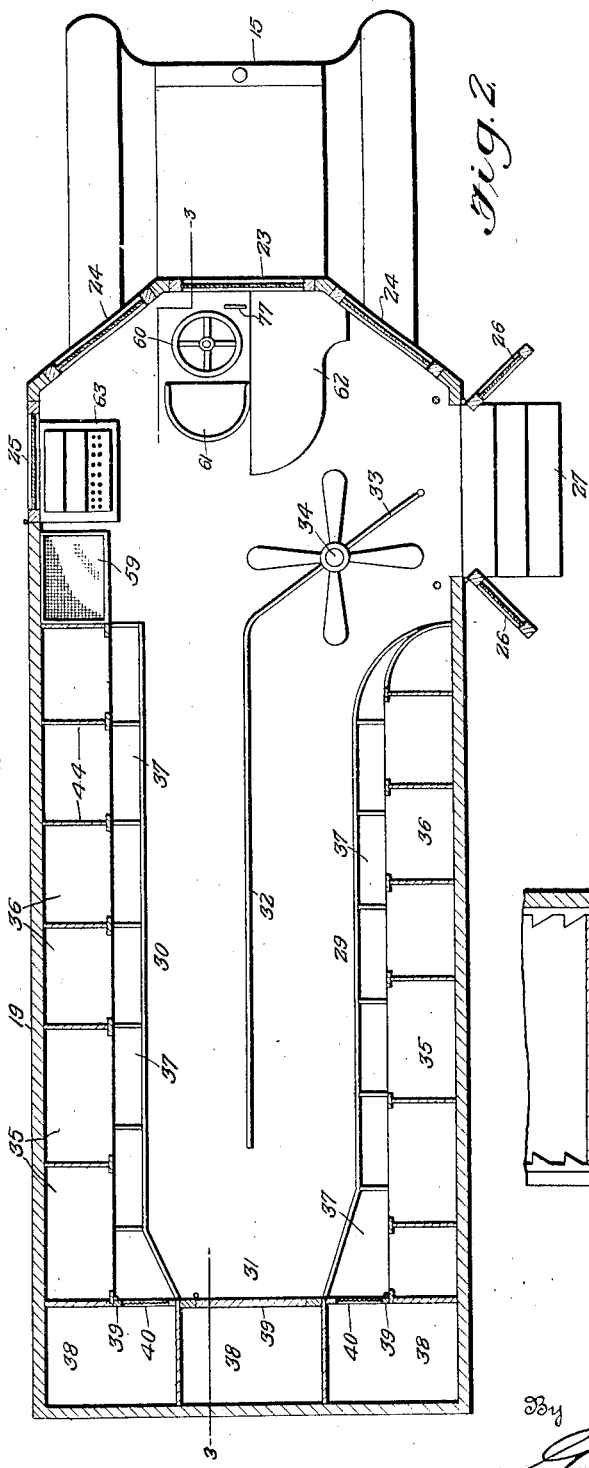
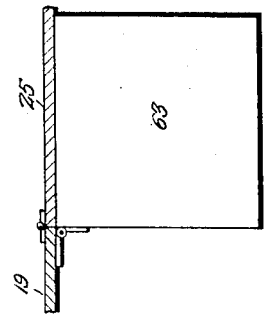
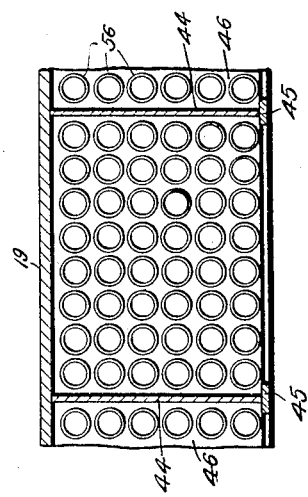
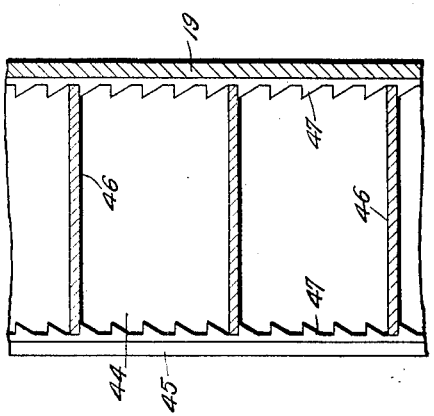
Inventor
C.W. Martin,
L.E. Hoffman,
By
Geo. P. Kimmel. Attorney

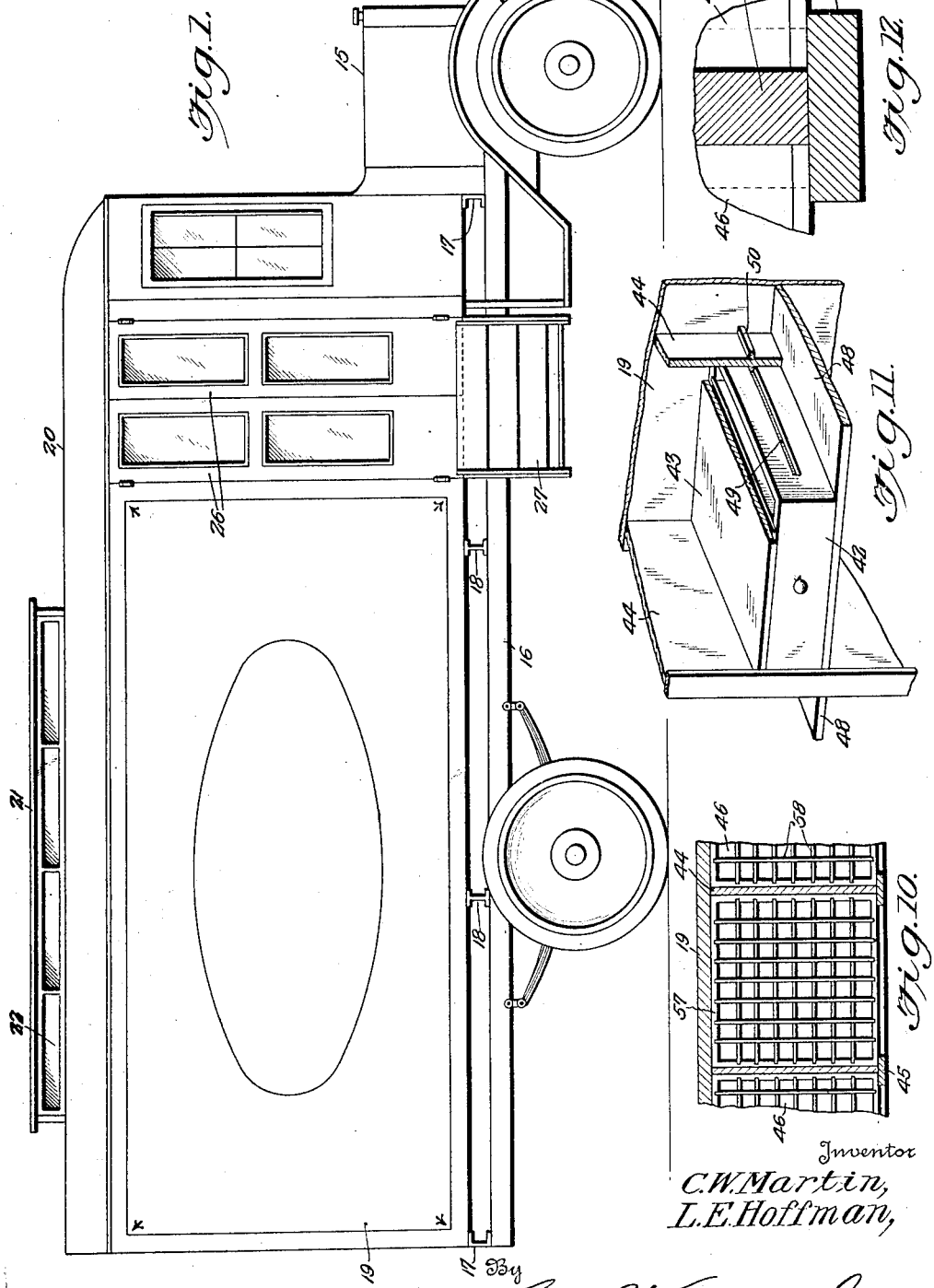

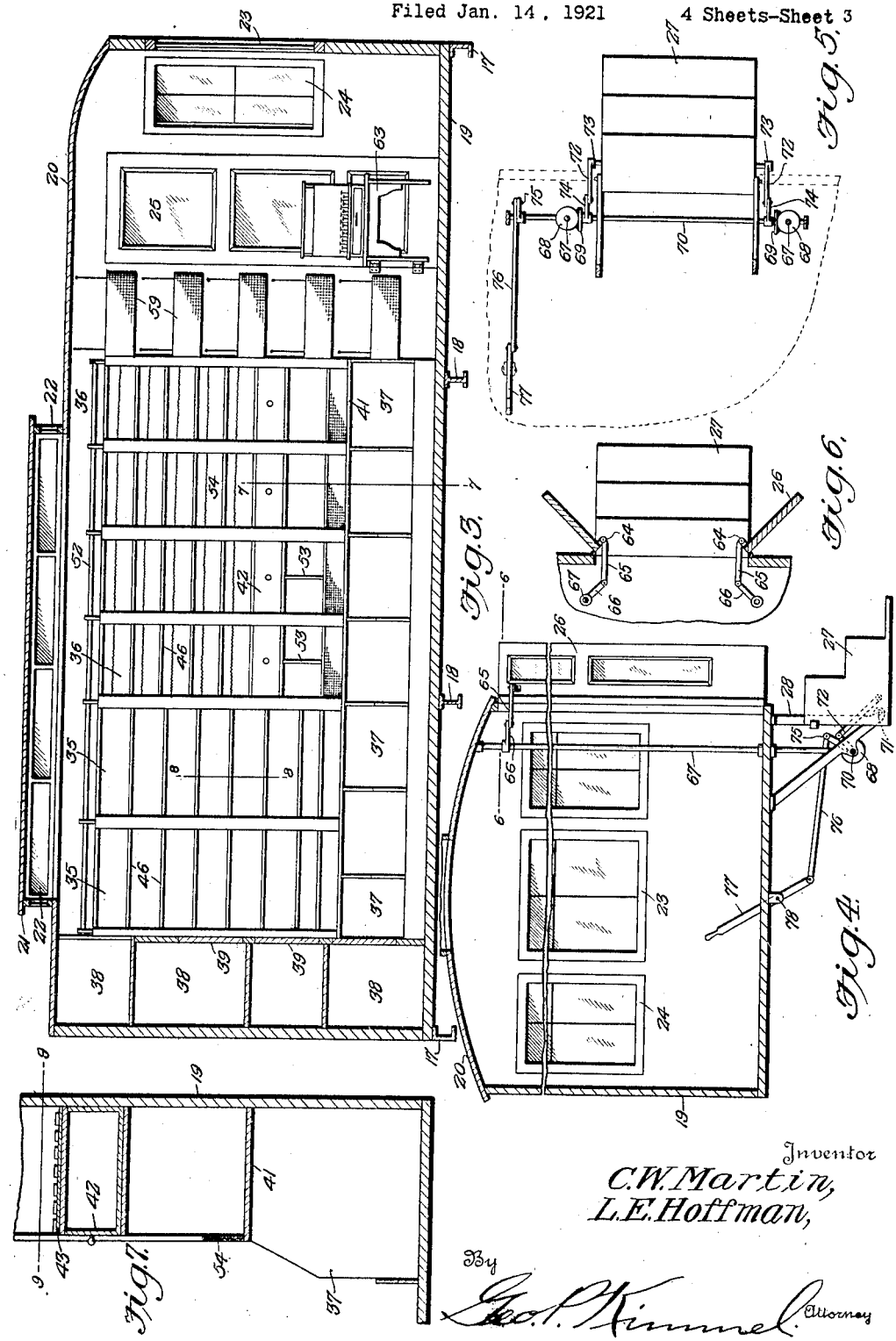

Aug. 28, 1923.
C. W. MARTIN ET AL
1,466,539
ITINERANT VENDING AND SALES VEHICLE
Filed Jan. 14, 1921    4 Sheets-Sheet 4
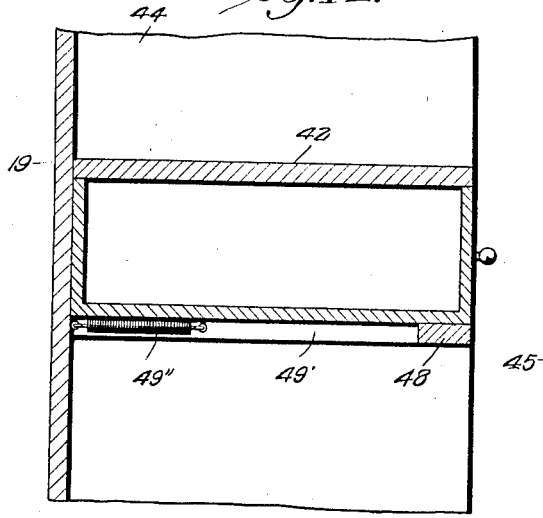
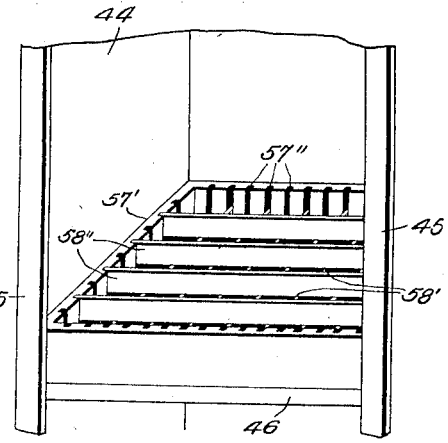
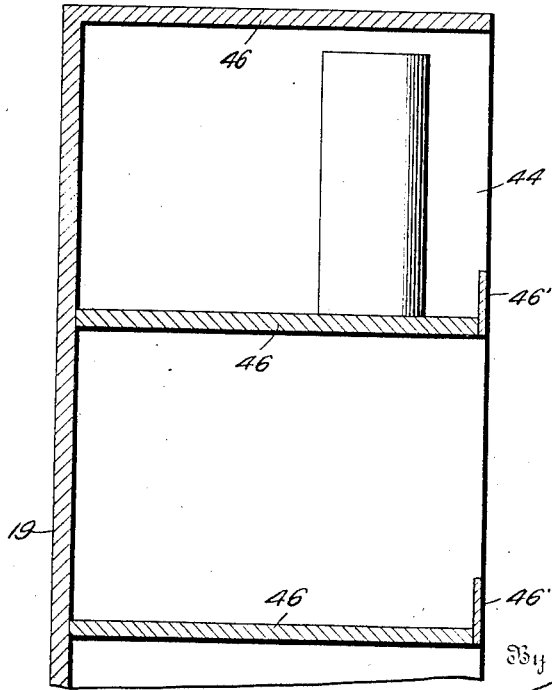
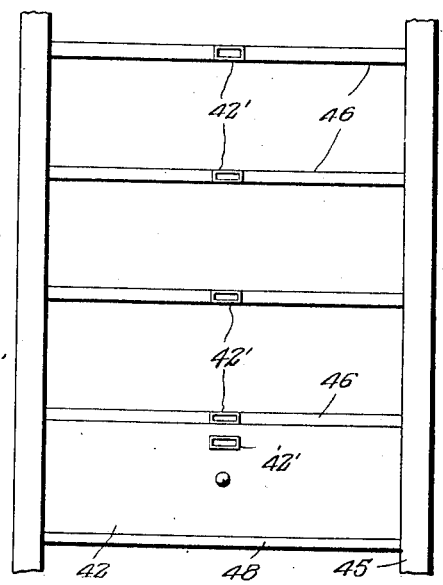
Inventor
C.W.Martin,
L.E.Hoffman,
By
Geo.P.Kimmel Attorney Patented Aug. 28, 1923.

1,466,539

UNITED STATES PATENT OFFICE.

CLYDE W. MARTIN, OF LITTLE ROCK, ARKANSAS, AND LEONARD E. HOFFMAN, OF ST. LOUIS, MISSOURI.

ITINERANT VENDING AND SALES VEHICLE.

Application filed January 14, 1921. Serial No. 437,266.

*To all whom it may concern:*

Be it known that we, CLYDE W. MARTIN, a citizen of the United States, residing at Little Rock, in the county of Pulaski and State of Arkansas, and LEONARD E. HOFFMAN, residing at St. Louis, Missouri, have invented certain new and useful Improvements in an Itinerant Vending and Sales Vehicle, of which the following is a specification.

The invention relates to improvements in an itinerant vending or sales vehicle, and more particularly to a motor driven type of the same.

The primary object of the invention is to provide for a vehicle of the character mentioned, and one involving an arrangement of the interior thereof for the display and sale of merchandise, after the manner of the now commonly known "self service" stores.

Another object of the invention is to provide the interior of a vehicle of this type with suitable articles of display supports, such as shelves, drawers, containers, and the like, such supports being adjustable for different sized articles, or to vary the capacity of the space between the adjacent supports, and interchangeable, in part, to adapt the same for retaining different classes of articles of merchandise.

A further object of the invention is to provide the article display support arranged within the body of a vehicle, as hereinbefore set forth, with means for retaining the display articles of merchandise in position on the same and against displacement therefrom during the travel of the vehicle.

A still further object of the invention is to provide a vehicle of the character described, and one wherein the interior arrangement of the body of the same admits a complete supervision of the sales of merchandise, including the admitting of patrons to the car, the collecting of the purchase money for the articles sold, and the registering of the amount of sales, being done solely by the operator of the vehicle, without the latter leaving his or her position from which the vehicle is operated.

Another object of the invention is to provide the interior of the body of a vehicle of the character described, with suitable means for the proper ventilation of the same, in addition to provisions for the proper lighting effect thereto, A still further object of the invention is to provide the body of the vehicle with suitable entrance and exit openings in full view and close proximity to the operator, one of such openings being arranged for the dual function of admitting patrons for the purchase of articles and permitting their exit after the purchases have been paid for, the latter opening having closures under the control of the operator of the car.

With the foregoing and other objects in view, which will be hereinafter more readily apparent, the invention resides in the new and useful construction and arrangement of parts as will be hereinafter more fully described, set forth in the appended claims, and illustrated in the accompanying drawings, in which:—

Figure 1 is a side elevation of the vehicle,

Fig. 2 is a horizontal section showing the interior of the body thereof,

Fig. 3 is a vertical longitudinal section taken on the line 3—3 of Fig. 2,

Fig. 4 is a transverse section showing the main door and step operating and control means, Fig. 5 is a detail view, of the main doors and step operating means, Fig. 6 is a sectional detail of the door actuating means taken on the line 6—6 of Fig. 4.

Fig. 7 is a fragmentary section showing a combination section of article supports and containers, the same being taken on the line 7—7 of Fig. 3.

Fig. 8 is a fragmentary sectional detail taken on the line 8—8 of Fig. 3, and showing the adjustable shelf construction.

Fig. 9 is a fragmentary sectional detail taken on the line 9—9 of Fig. 7, and showing a means for retaining articles, such as bottles, cans, and the like, in position during the travel of the vehicle.

Fig. 10 is a fragmentary sectional detail showing a retaining means for a purpose similar to that in Fig. 9.

Fig. 11 is a fragmentary sectional detail showing the construction and arrangement of a drawer form of article container.

Fig. 12 is a fragmentary sectional detail of construction of one of the vertical divisions of the shelf and container arrangements, and, Fig. 13 is a sectional detail showing the shelf arrangement for supporting a cash register in close proximity to the operator at the forward end of the vehicle.

Figs. 14, 15, 16 and 17 are each detail views of the shelving.

Referring to the drawings, in which similar characters of reference indicate corresponding parts in the several views thereof, the numeral 15 indicates in general the running gear and power plate of a motor driven vehicle having longitudinally extending side bars 16 upon which are arranged and secured in spaced relation a series of transversely extending bars or beams, the outer of these bars or beams, as at 17, being preferably of U-shaped angle iron, the channels of which are disposed in opposed relation one to the other, while the intermediate bars, as at 18, are preferably of angle iron of I form, in cross section.

Supported on the transverse bars or beams 17 and 18 is a body 19, the same being of closed construction throughout the major portion of its opposite sides and at its rear end, and having its roof portion 20 formed, with a raised deck portion 21 which has its sides and ends provided with small, elongated window sections 22 for lighting the interior of the body. This raised deck portion 21 is arranged to extend for a distance intermediate the ends of the closed darkened portion of the body, and the window sections of the same may be arranged so that they may be opened for ventilating purposes.

The forward end of the body 19 is provided with a center window section 23, the same approximating in width the enclosing hood of the power plant of the vehicle, and angularly disposed side window sections 24, the windows in these sections 23 and 24 being of usual form of window construction, and arranged to be opened for ventilation purposes, either by a sliding movement or a hinging movement as may be desired. Immediately adjacent each of the side window sections 24 and in the sides of the body, are arranged exit openings, the opening, preferably at the left side of the operator, having a hinged door 25, while the opening at the right of the operator, which is of greater width than that on the left side, is provided with a pair of outwardly hinged doors 26. The opening closed by the doors 26 constitutes the main entrance of exit to and from the body of the vehicle and is primarily intended for the use of patrons, and for the purpose of giving easy and ready access to the same, a set of folding steps 27 are provided, and are supported in proper position with respect to the door opening by means of brackets or hangers 28 secured to the underside or floor of the body.

Extending interiorly of the opposite sides of the body are article support units or sections 30 and 31 forming therebetween an aisle-way having a hand rail 32, to divide the same into a looped passage or aisleway, admitting of the passage of a person or patron along one side of the hand rail 32 in front of the article support section 30, around the inner end of the same, and along the other side thereof in front of the article support section 31. The forward end of the hand rail terminates in a bend, in the plane of the front ends of the article support sections 30 and 31, and connecting a diagonally extending portion 33 which terminates at a point medially of the main entrance, so as to divide the entrance opening into two parts, one part, preferably to the left of the diagonally extending portion 33, allowing for the ingress of patrons, and the other, to the right of the latter, for their exit. Medially of the left of the diagonally extending portion 33 is arranged a turn stile 34 controlling the passage of patrons coming through and leaving the entrance 26.

The oppositely arranged article support sections 30 and 31 are made up of vertical series of shelf sections, as at 35, or combination series of shelf sections and drawer sections, as at 36, and extending horizontally below each of these sections 30 and 31, one for each pair of shelves or combination series of shelves or drawers, are a series of pockets or bins 37. Extending across the rear of the body are a series of cupboards 38, each cupboard section being provided with a hinged door closure 39, which door closure 39 may be either of a solid construction or provided with wire screen openings as at 40. We have shown in Fig. 7, the combination shelf and drawer sections comprising a lower shelf 41 having a bin 37 formed thereunder, a drawer section 42 immediately above the same, and a second fixed shelf 43, in turn, immediately above the drawer sections 42. The vertical shelf sections 35 and the combination shelf and drawer sections 36 may be constructed as a complete unit, or separately as desired, each section being divided from the other by a vertical partition 44 and flat facing strips or posts 45, as shown in Fig. 12. The shelf boards or elements 46 are adjustably supported in position between the partition 44 by means of toothed strips 47 arranged in pairs vertically of the partitions and on the opposite walls thereof, as is shown in Fig. 8, the drawer sections 42 are slidably mounted under the fixed shelf section 43 and immediately above a supporting plate or board 48, and the opposite sides of the same are preferably slitted, as at 49, to provide longitudinally extending slots for receiving guide flanges 50 secured to the adjacent walls of the partitions 44. The supporting plate or board 48, as shown in Fig. 14, is preferably slotted, as at 49', rearwardly and medially thereof from a point adjacent the front edge of the same, and this slot is adapted to house a coiled spring 49″, the rear end of the spring being secured in the rear end of the slot and the front end of the spring to a suitable eye or fastening depending from the under side of the drawer 43, whereby the spring 49″ is expanded when the drawer is moved to open position, and contracts to return the drawer to normally closed position, when the desired merchandise has been placed in the same or taken therefrom, and it is released for such purpose. The top shelf element 51, extending over all of the sections of a unit, is spaced below the roof 20 of the body of the vehicle, and is provided with a guard rail 52 to prevent articles supported thereon from being displaced or thrown off during the travel of the vehicle. The fixed shelf compartments 41 immediately below the drawer sections may be, in part, subdivided, as at 53, to provide compartments of smaller capacity. All of the several shelves 46 may be and preferably are provided with a guard strip 46′ extending across the front edges thereof so as to prevent articles supported thereon from being thrown from the same during the travel of the vehicle (see Fig. 16).

Certain of the shelf compartments may be provided with wire guards 54 to retain articles in place within the same, also certain of the shelves may be provided with pads, as at 55, of rubber or the like, to retain bottled or canned goods in position, the pads 55 being formed in some instances with a plurality of circular flanges 56 forming seats for such bottled or canned goods, the latter construction being shown in Fig. 9. However, in lieu of the pads 55, the bottled or canned goods retainers may be constructed, as in Fig. 10, of substantially square or rectangular frames 57, conforming to the size of a particular compartment, and these frames are provided with a series of crossed and interlocked partition members 58 forming pockets, substantially square in form, each pocket receiving a bottle or can for the purpose. Immediately between the end of the article support units 30, at the left side of the body 19, and the door 25, is arranged a tier of wire baskets or the like 59, each adapted for displaying fruit or fresh vegetables and the like, or such other articles requiring free ventilation. Certain of the shelf compartments for the reception of bottles or cans may be constructed as is shown in Fig. 15, wherein the frames 57′ having their exposed or inner faces formed with a plurality of vertically extending channels or grooves 57″ into which are to be removably fitted cross partition members, one set of such members 58′ extending from front to rear and another set 58″ extending from side to side of a shelf compartment and resting upon the lower set of such members 58′, the opposite ends of both sets of the members having engaged in complemental grooves of the frame, and by interchanging the members in various of the grooves, the area of the pockets formed between the same may be increased or decreased accordingly.

It is contemplated to have suitable devices for the display of price marks of the goods in all of the compartments, drawers, and etc., and as shown in Fig. 17; the front edge of all of the shelf boards 46 and the front faces of the drawers 42 and of such other containers or devices as may be used for the display of goods, are provided with label holders 42′, which may be of any known or suitable type adapted to interchangeably receive and retain price labels in full view of purchasers in their passage around the looped aisle-way.

At the front end of the body, and immediately in the rear of the center window section 23, is arranged the steering mechanism 60, and the operator's seat 61, and immediately to one side of the same, is a counter 62 at which patrons must stop to pay for their selected purchases, while at the opposite side thereof, and slightly in rear of the same, is a shelf 63, which is hinged at one side of the door opening 25, and which, when in use, extends across the opening 25 and supports thereon a cash register within easy reach of the operator.

For the purpose of opening and closing the doors 26, of the main entrance to the vehicle, and for raising and lowering the folding steps 27 leading to and from the main entrance, the doors being hinged at each side of the entrance opening, are provided with pivot lugs 64 which are connected to lever arms 66 by means of links 65. The lever arms 66 are secured in proper position on vertically disposed rotatable shafts 67, which have their lower ends projecting through and below the floor of the vehicle body. The lower ends of the shafts 67 are provided with beveled gears 68 arranged in mesh with complemental beveled gears 69 carried by a shaft 70, the latter shaft being disposed parallel to and in rear of the folding steps 27, and suitably journalled in brackets depending from the under side of said body. The steps 27 are constructed as a unit, and are pivoted, as at 71, to the brackets 28, and are actuated to and from operative position through the medium of links 72, which pivotally connect the steps, as at 73, in advance of the pivots 71, and to lever arms 74 carried by the shaft 70. The steps 27 are foldable from operative position in a manner to be disposed immediately under the floor of the body when not in use. The shaft 70 is rotatably mounted in the brackets 28, and has its forward end provided with a lever arm or crank 75, which is connected by a link rod 76 to the lower end of an actuating lever 77. This actuating lever 77, is pivoted, as at 78, and extends upwardly through the floor of the body to a point immediately adjacent the steering mechanism of the vehicle, and within easy reach of the operator.

The vehicle, thus provided, constitutes a complete sales room embodying all of the important features and conveniences of a "self service" store, such as are now in vogue in cities of large size, and is primarily intended to admit of extending to persons living in small towns and outlying districts, the same privileges in the making of their purchases as is now enjoyed only by the people of more thickly settled portions of the country, and, at the same time, render the cost of operation of such a traveling store as low as possible comparable with that obtained in the usual "self service" stores as aforesaid.

In the operation of the vehicle, the same is driven and controlled in the same manner as are automobiles, and without leaving his or her seat, the operator can make a stop, grasp the hand lever 77 and throw the same in a manner to rotate the shaft 70, for the simultaneous opening of the door, with the lowering of the step; and when patrons have entered the body and passed around the aisle-way, passing through the turn stile when entering and leaving the aisle-way, the operator collects the purchases at the counter 62 and receives the money and deposits the same in the cash register. By having the turn stile 34 revolve in one direction only, it is possible for the operator to keep count of the number of patrons in the store and to be assured of any one leaving the car without paying for collected goods.

It is understood that various types of vehicles, other than motor driven, and changes in detail, construction and arrangement of parts thereof, other than as specifically described herein may be resorted to without departing from the spirit and scope of the invention.

Having thus fully described the invention, what is claimed, is:—

1. A vehicle for vending or sales purposes comprising a chambered body having a combined entrance and exit opening at the forward end of one side thereof, a railing within said body and terminating at one end at a point in proximity to the rear end of said body, said railing having the major portion thereof disposed longitudinally and centrally of said body and having the remaining part thereof arranged at the forward portion of and disposed diagonally with respect to said body and extending to a point in close proximity to said opening, said railing providing said body throughout with continuous entrance and exit passageways, the former leading from and the latter to said opening, a driver's seat at the forward end of said body in proximity to the forward end of said exit passageway, a normally closed and easily opened emergency exit door at the forward end of the other side of said body and in proximity to said driver's seat, article display devices arranged within said body at the sides and rear end thereof, and a turn-stile having its operating shaft disposed intermediate the ends of said diagonal portion of the railing, said turn-stile extending into each of said passageways.

2. A portable vending or sales vehicle comprising a chambered body having a combined entrance and exit opening at the forward end of one side thereof, and a normally closed and easily opened emergency exit door at the forward end of the other side thereof.

3. A portable vending or sales vehicle comprising a chambered body having a combined entrance and exit opening at the forward end of one side thereof, a normally closed and easily opened emergency exit door at the forward end of the other side thereof, means within said body to provide entrance and exit passageways, the former leading from and the latter leading to said opening, and said door arranged in proximity to the forward portion of said exit passageway.

4. A portable vending or sales vehicle comprising a chambered body having a combined entrance and exit opening at the forward end of one side thereof, a normally closed and easily opened emergency exit door at the forward end of the other side thereof, means within said body to provide entrance and exit passageways, the former leading from and the latter leading to said opening, said door arranged in proximity to the forward portion of said exit passageway, and a driver's seat positioned between said door and said opening.

5. A portable vending or sales vehicle comprising a chambered body having a combined entrance and exit opening at the forward end of one side thereof and a normally closed and easily opened emergency exit door at the forward end of the other side thereof, a driver's seat at the forward end of said body portion and arranged between said opening and door, and an article supporting element hinged to the last mentioned side of said body and adapted to be swung across said door and further positioned in proximity to the driver's seat whereby the article on said element can be quickly removed and the element swung away from the door so that the latter can be quickly opened.

6. A portable vending or sales vehicle comprising a chambered body having a combined entrance and exit opening at the forward end of one side thereof, a driver's seat positioned forwardly of said opening, means to provide said body with parallel entrance and exit passageways, the former leading from and the latter leading to said opening, a turnstile positioned in proximity to said opening and controlling said passageways, a counter arranged between the driver's seat and said turnstile, and a normally closed and easily opened emergency exit door at the forward end of the other side of said body and arranged in proximity to said driver's seat.

7. A portable vending or sales vehicle comprising a chambered body having a combined entrance and exit opening at the forward end of one side thereof, a driver's seat positioned forwardly of said opening, means to provide said body with parallel entrance and exit passageways, the former leading from and the latter leading to said opening, a turnstile positioned in proximity to said opening and controlling said passageways, a counter arranged between the driver's seat and said turnstile, a normally closed and easily opened emergency exit door at the forward end of the other side of said body and arranged in proximity to said driver's seat, and an article supporting element hinged to the last mentioned side of said body and adapted to be swung across said door and further positioned in proximity to the driver's seat whereby the article supported by said element can be quickly removed and the element swung away from the door so that the latter can be quickly opened.

In testimony whereof we affix our signatures hereto.

CLYDE W. MARTIN.
LEONARD E. HOFFMAN.